3,395,538
GAS TURBINE ENGINE AFTERBURNER FUEL
CONTROL AND IGNITION
Ronald F. Borel, Cincinnati, and Edmund S. Lee III, Terrace Park, Ohio, assignors to General Electric Company a corporation of New York
Filed Dec 22, 1966, Ser. No. 604,032
11 Claims. (Cl. 60—243)

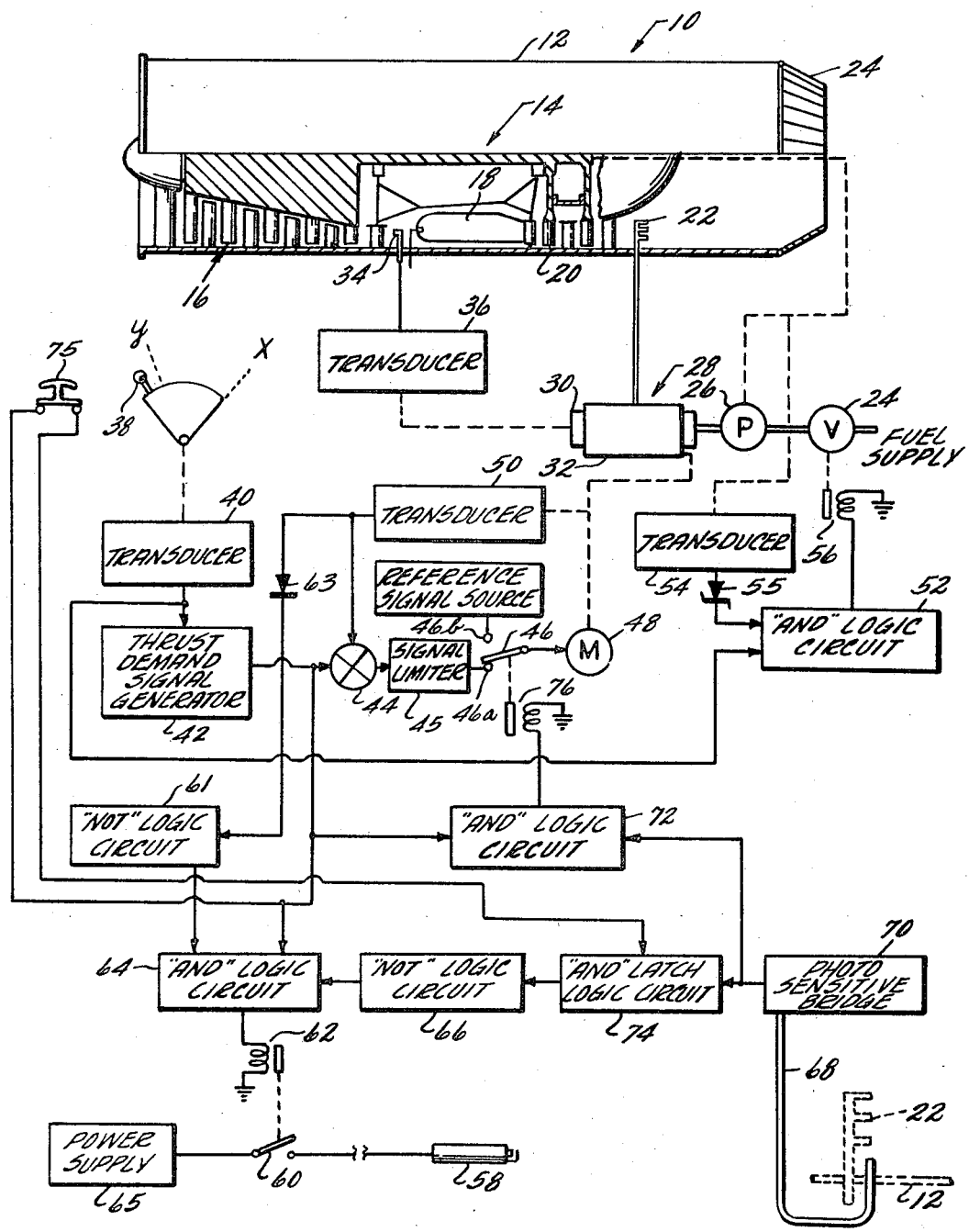

ABSTRACT OF THE DISCLOSURE

The present invention relates to improved means for controlling the flow to and the ignition of fuel in afterburners of gas turbine engines so as to initiate afterburner operation at a low level of combustion and thereby minimize abrupt thrust and pressure increases.

---

Gas turbine engines generally comprise an axial flow compressor which delivers pressurized air to a combustor. Fuel burned in the combustor generates a hot gas stream which passes through a turbine to drive the compressor rotor. The remainder of the energy of the hot gas stream may be converted into a propulsive force, for airplane operation, by discharging it through a nozzle. Alternatively, the hot gas stream may pass through a second turbine which drives a fan at the intake end of the engine. Such a fan then pressurizes a concentric air stream. These two gas streams may be discharged through separate or common nozzles to provide the desired propulsive force. In either arrangement it is known technique to increase the propulsive force by burning further fuel in the gas stream prior to its discharge from the nozzle in what is referred to as an afterburner.

There are several reasons why the initial combustion of afterburner fuel should be at a low rate. First, it is desirable to minimize the increment of thrust increase resulting from afterburner ignition, both from a standpoint of comfort and protection of engine components from undue stress. Secondly and particularly in the case of fan type engines referred to, a rapid increase in pressure resulting from a large initial rate of afterburner combustion can cause a stall condition in the fan and/or compressor of the engine, which, in turn, can lead to a complete loss of power.

One object of the invention is to provide simple and reliable means for assuring initial ignition of afterburner fuel at a low rate of combustion and thereby minimize the thrust increase increment and pressure increase.

Another and further object of the invention is to provide the best afterburner re-ignition mode for a given flight condition in the event of a flame-out in the afterburner.

To further explain this object of the invention, when a flame-out occurs in the afterburner, some malfunction or abnormal occurrence has been the cause. Under certain flight conditions it is preferable that the pilot make a conscious decision that an attempt should be made to re-ignite the afterburner. That is, the pilot should be given an opportunity to check whether re-ignition is feasible or whether other corrective measures should be taken to maintain or carry out, as best as possible, his flight mission. Under other flight conditions it is desirable that every attempt be made to re-ignite the afterburner as quickly as possible without requiring pilot attention to obtain this end.

In accordance with the present invention, improved means are provided for controlling the flow of fuel to the nozzles of an afterburner and igniting this fuel. The fuel itself is pressurized and supplied to the afterburner nozzles by metering means at a controlled rate when afterburner operation is desired. When the pilot displaces a throttle lever to a position demanding afterburner thrust or operation, a demand signal is generated indicative of a thrust level corresponding with the position of the throttle lever. However, this demand signal does not control the rate of fuel flow until after ignition of a preset low rate of afterburner fuel flow. Thus when the thrust lever is first displaced to call for afterburner operation, a preset low rate of fuel is fed to the nozzles in response to such movement. At the same time, means for igniting this fuel are energized. Thereafter when ignition occurs and is detected by appropriate means, the thrust demand signal automatically controls the rate of fuel flow to give the desired thrust output from the afterburner.

In the event of a flame-out in the afterburner, means are provided for reducing, at least to a very low rate, the fuel flow to the afterburner nozzles in response to a detection of lack of ignition by the ignition-detecting means. This prevents auto-ignition of any excessively large amounts of fuel as well as conserving fuel.

In order to assure that the pilot makes a conscious decision regarding re-ignition of the afterburner, means are provided for de-energizing the igniting means in response to detection of ignition of the afterburner fuel. Other means are then provided to prevent re-energization of the ignition means until the throttle lever has been displaced to a position in which there is no demand for afterburner thrust.

Alternatively, means may be provided for returning the metering means to a minimum flow condition upon loss of afterburner ignition. By employing means for sensing when a minimum fuel flow exists, a signal may be provided for automatically re-energizing the ignition means at a safe level.

As a further alternative, a common system may be provided for both automatic and manual re-energization of the afterburner ignition means where a multi-mission control is desired. This end is attained, in effect, by providing means for overriding the requirement that the throttle lever be displaced from an afterburner demand position to obtain re-ignition. These means may be selectively employed for automatic re-ignition or a more rapid re-ignition than might be available by throttle lever manipulation.

Advantageously the above described means employ a novel arrangement of logic circuit components, more fully described hereinafter.

The above and other related objects and features of the invention will be more fully apparent of a reading of the following description of the disclosure found in the accompanying drawing and the novelty thereof pointed out in the appended claims.

The single figure of the drawing is a schematic illustration of a preferred embodiment of the present invention.

The drawing schematically shows the basic components of a gas turbine engine 10 which comprises a generally tubular housing or casing 12 having a rotor 14 mounted therein. The rotor comprises a bladed portion of a compressor 16 which delivers pressurized air to a combustor 18. Fuel is ignited in the combustor 18 to generate an annular hot gas stream which passes through a turbine 20 formed, in part, by another bladed portion of the rotor 14. The hot gas stream then passes to an afterburner duct portion where nozzles 22 inject further fuel for combustion in the gas stream to increase its energy level. The so-called augmented hot gas stream then passes through a discharge nozzle 24 to provide a propulsive force as in the usual installation of such engines in aircraft.

Fuel for the afterburner nozzles 22 flows from an appropriate supply through a valve 24 to a pressurizing pump 26, which is mechanically driven from the engine rotor 14. Pressurized fuel then passes through a metering valve 28 to the nozzles 22.

The metering valve 28 comprises two ported displaceable elements 30 and 32. The element 30 is positioned as a function of the mass of air flowing through the engine as derived from the pressure of the air discharged from the compressor 16. To this end a pressure probe 34 at the compressor discharge is connected to a function generator, or transducer 36, which may be of a known construction. The transducer 36 has a mechanical output connected to the valve element 30 to properly position it as a function of the mass of air flowing through the engine and available for combustion in the afterburner.

The valve element 32 is positioned as a function of the position of a pilot controlled throttle lever 38. The throttle lever 38 may be employed to control "dry" operation of the engine 10 where fuel is fed only to the combustor 18 as the throttle lever is maintained between positions $x$ and $y$. When the lever 38 is displaced beyond position $y$, it controls afterburner operation as well. The present circuit is concerned only with controlling afterburner operation and hence, no reference to "dry" operation is made except to assume that a pre-determined level of combustion is being maintained in the combustor 18.

The throttle lever 38 is mechanically connected to a transducer 40 which provides, when afterburner operation is demanded, an output signal as a function of displacement of the throttle lever 38 beyond position $y$. This output signal is then fed to a thrust demand signal generator 42 which, in effect, provides a demand signal for a specified fuel to air ratio, which in turn, will give the thrust output called for by the position of the throttle lever 38. This demand signal passes through a summation point 44 and then to a signal limiter 45 which limits the rate of fuel flow change to minimize afterburner pressure change as well as thrust "jump." From the limiter 45 the signal is applied through a switch 46, as a control signal, to a torque motor 48. Mechanical output of the torque motor or actuator 48 then displaces the valve element 32.

The valve elements 30 and 32 provide a multiplication factor which produces the desired fuel flow. Since valve element 30 is positioned as a function of the volume of air and since the demand signal is the ratio of fuel to air, the combined action of the two elements meters the proper amount of fuel to the afterburner nozzles 22. A null-balancing servo-loop is provided by a mechanical connection from the valve element 32 to a transducer 50 which provides a signal indicative of the amount of fuel being metered to the afterburner nozzles 22 (actually it is the fuel to air ratio which is measured). The output of the transducer 50 is then fed to a summation point 44. When the signal from the transducer 50 is equal to an opposite in polarity to the demand signal from the generator 42 there is no further control signal fed to the torque motor 48 and the valve element 32 is properly positioned to provide the thrust demanded by the setting of the throttle lever 38.

The elements, as described above, are well known and conventionally employed to regulate fuel flow to the afterburner of the gas turbine engine. The further circuitry components now to be described provide a unique method for initially igniting fuel in the afterburner and for controlling re-ignition of the fuel in the event of a flame-out of the afterburner.

When the engine 10 is operating in a "dry" regime, the valve 24 is closed and the contact arm of switch 46 engages contact point 46b which connects a reference signal source to the torque motor 48. This reference signal automatically maintains the valve element 32 in a minimum flow condition. Further, throttle lever 38 is positioned in the "dry" operating range between positions $x$ and $y$, and there is no input to the transducer 40 and consequently no afterburner thrust demand signal.

When the lever 38 is shifted beyond position $y$ to call for afterburner operation there is a signal output from the transducer 40. This signal is fed to an AND logic circuit 52. The characteristic of this AND logic circuit and others referenced here and after, is that all of the inputs thereto must be energized before there will be an output. The second input to the logic circuit 52 is provided from a transducer 54 having a mechanical input from the engine rotor 14. When the output from the transducer 54 indicates that the engine rotor 14 has reached a predetermined minimum speed, a signal is passed through a Zener diode 55 to the logic circuit 52. The two conditions of engine speed and thrust demand are met and the resulting output of the logic circuit 52 energizes a solenoid 56 to open the valve 24. These functions can also be derived from the main fuel control (not shown) conventionally employed for supplying fuel for the combustor 18. When the valve 24 is open, fuel then flows to the pump 26 and passes through the metering valve 28 to the afterburner nozzles 22. As was indicated above, the metering valve does not have a shut-off position, but is only displaced to a minimum flow position in which sufficient fuel is passed to the spray bars 22 to support light-off combustion of the fuel.

Movement of the throttle lever 38 past position $y$, also initiates the sequence for ignition of the low flow rate, light-off fuel. When afterburner operation is called for, a signal input is provided to an AND logic circuit 64. The characteristic of this AND logic circuit is that it requires three inputs in order to obtain an output. A second input to the circuit 64 is provided from a NOT logic circuit 66 (later described) to which there is no input. The third input to the logic circuit 64 is provided from a second NOT logic circuit 61. The characteristic of a NOT logic circuit is that with no signal input thereto, an output is provided, and conversely when there is an input, there is no output. The input to the logic circuit 61 is derived from the transducer 50, which indicates the position of the valve element 32. When the valve element 32 is in its minimum flow position, there is a minimum signal output from the transducer 50, which is insufficient to pass through a diode 63. Thus, there is no input to the logic circuit 61 and a third input is supplied therefrom to the AND logic circuit 64. Under these conditions which indicate that afterburner operation is demanded, and that the metering valve 28 is in its minimum flow position, an output is obtained from the logic circuit 64 which energizes a solenoid 62, causing a switch 60 to be closed. This completes a circuit from a power supply source 65 to an igniter 58, which is physically positioned adjacent the afterburner spray nozzles 22 to ignite the minimum flow therefrom.

Ignition and combustion of afterburner fuel is detected by means which comprise a light pipe which extends from a point adjacent the afterburner nozzles 22, to a photosensitive bridge 70. The presence of a flame at the afterburners is thus sensed by the photo-sensitive bridge 70 and an output is provided therefrom to an AND logic circuit 72. This logic circuit has a second input, thereto, from the thrust demand signal generator 42. Thus, when there is a demand for afterburner operation and ignition of the minimum afterburner flow, there is an output from circuit 72 which energizes a solenoid 76 to bring the contact arm of switch 46 from contact point 46b to contact point 46a. The resultant error signal from summation point 44 is then applied to the torque motor 48, and the valve element 32 positioned as a function of displacement of the throttle lever 38, as above described.

Once ignition of the afterburner fuel has been sensed, the igniter 58 is no longer energized as two of the three inputs to the AND logic circuit 64 are removed. Thus, when there is an output from the photo-sensive bridge 70, there is also an input to an AND latch logic circuit 74. Since there is already an input to this logic circuit from the thrust demand signal generator, through a switch 75, the addition of the photo-sensitive bridge input creates an output, therefrom, which is fed to the NOT logic circuit 66. In accordance with the characteristic of this NOT circuit, when there is an input, thereto, its output is automatically removed from the logic circuit 64.

Also, when the AND logic circuit 72 energizes solenoid 76, the valve element 32 will be displaced beyond its minimum flow position. The output signal from transducer 50 will increase in strength and pass through the diode 63, providing an input to the NOT logic circuit 61, thereby removing its input from the AND logic circuit 64.

In normal operation, the above circuit is de-energized by displacing the throttle lever 38 below position y. When this is done, the signal input to the AND logic circuit 52 is removed, de-energizing solenoid 56 and shutting off fuel flow. This causes the afterburner flame to be extinguished. The demand signal is removed from the AND logic circuit 72, de-energizing solenoid 76, and imposing the closing reference signal, from contact 46b, on the torque motor 48, whereby the valve element 32 will be displaced to its minimum flow position. The demand thrust signal is also removed from the AND logic circuit 64 and the AND latch logic circuit 74. With the flame extinguished, there is no longer an input from the photo-sensitive bridge 70 to the AND latch logic circuit 74, thus when both signals are removed from this latter logic circuit, its output is cut off, and again there is an input from the NOT logic circuit 66 to the AND logic circuit 64 so that the system is thus, as previously described, in readiness for ignition of the afterburner fuel.

In the event of a flame-out of the afterburner during augmented operation, the input to the photo-sensitive bridge 70 is removed and its output is removed from the AND logic circuit 72 causing de-energization of the solenoid 76 and automatically shifting the contact arm of switch 46 from contact point 46a to contact point 46b, so that the closing signal will be imposed on torque motor 48 and fuel flow automatically reduced to its minimum flow. However, minimum fuel flow cannot be re-ignited until after the throttle lever 38 is displaced below position y. Thus, it will be seen, that while one of the inputs (from photo-sensitive bridge 70) is removed from the AND latch logic circuit 74, it will not be de-energized until the second input from the thrust demand signal generator 42 is also removed. This prevents an output from the NOT logic circuit 66 to the AND logic circuit 64. Energization of the solenoid 62 and closure of switch 60 to fire the igniter 58 cannot be had until the demand signal is removed from the AND latch logic circuit 74. The pilot thus has to return the engine 10 to a "dry" operating regime before afterburner operation can be re-initiated.

The above described mode of operation is in many instances preferable since an afterburner blowout is an unusual condition which in many instances should be checked by the pilot to see whether other corrective action should be taken before an attempt is made to re-ignite the afterburner.

However, there are other occasions where automatic re-ignition of the afterburner is desirable. To obtain such a mode of operation, switch 75 which may be located in the pilot's cockpit, is opened. This removes the demand signal input from the AND logic circuit 74. When this is done, there is, at all times, an output from the NOT logic circuit 66. Thus, in the event of a flame-out, the above described sequence of operation will be followed, except that when the valve element 32 is displaced to a minimum flow position (or some other position where fuel flow is safe for re-ignition) the signal output from the transducer 50 will no longer pass through the diode 63, and under this condition of fuel flow, there will be an output from the NOT logic circuit 61, which, with the existing demand signal input, will produce an output from the AND logic circuit 64, to energize solenoid 62 and close switch 60. Thus, when fuel flow has been reduced to a minimum safe level, the igniter 58 will be energized and the system again recycled as previously described to initiate afterburner operation as a function of the position of the throttle lever 38.

The switch 75 may be left open during flight so that automatic re-ignition occurs when there is a flame-out, as above described. Alternatively, the switch 75 may be left closed and then in the event of a flame-out manually opened by the pilot to recycle the ignition sequence rather than requiring pilot manipulation of the lever 38, first below the position y, and then back above it.

Opening of the switch 75 converts the AND logic circuit to a two input circuit for automatic re-ignition. Similarly, the valve position input provision could be omitted from AND circuit 64 if it were desired to force the pilot to manipulate the throttle lever to attempt re-ignition.

In the preceding description, reference has been made to various signal generating and logic elements. It is to be understood that all of the components referred to are per se, well known to those in the art and, AND latch and NOT logic circuits can be provided to perform the described functions by known arrangements of transistors. The photo-sensitive bridge is likewise known. Transducers referred to may provide an output signal of appropriate strength and polarity to perform the desired functions. Similarly, a summation point may be obtained through utilization of an operational amplifier. Alternately, the described signal circuits may be mechanized, in whole or in part, by fluidic devices as well as other signal generating and handling means.

It will also be understood that the present invention applies to other types of afterburners such as in turbofan engines where fuel is burned in a duct, pressurized in whole, or in part, by air which has bypassed the so-called gas generator of such engines.

The present inventive concepts are therefore to be derived solely from the following claims and are not to be limited by the preferred embodiment herein described.

Having thus described the invention, what is claimed is novel and desired to be secured by Letters Patent of the United States is:

1. In a gas turbine engine comprising,
   an afterburner having nozzles for injecting fuel into a gas stream to provide increased thrust,
   means for controlling the flow of fuel and ignition thereof including,
   means for supplying pressurized fuel to said nozzles,
   metering means for controlling the rate of fuel flow to said nozzles,
   an operator-controlled throttle lever movable from a position in which afterburner operation is not demanded to a position demanding maximum afterburner thrust,
   means for generating a demand signal indicative of desired thrust level from said afterburner corresponding to the position of said throttle lever,
   means responsive to displacement of said throttle lever to a position demanding afterburner thrust, for initially supplying a low rate of fuel flow to said nozzles,
   means for igniting said fuel,
   means for detecting ignition of said fuel, and
   means responsive to detection of ignition of said fuel for then controlling the metering means is as function of said demand signal to thus obtain the desired thrust output from said afterburner.

2. In a gas turbine engine, means for controlling the flow of afterburner fuel ignition thereof as in claim 1, further comprising,
   means responsive to said ignition-detecting means indicating a lack of ignition for reducing, at least to a very low rate, fuel flow to the afterburner nozzles.

3. In a gas turbine engine, means controlling the flow of afterburner fuel and ignition thereof, as in claim 2, further comprising, means, responsive to detection of ignition of said fuel, for de-energizing said ignition means, and means for preventing re-energization of the ignition means prior to displacement of said throttle lever to a position removing said demand signal for afterburner operation.

4. In a gas turbine engine, means for controlling flow of afterburner fuel and ignition thereof as in claim 1 wherein, the means for metering fuel flow comprise a metering valve having a minimum position in which a very low rate of flow is provided to the nozzles, the means for initially supplying a low rate of fuel to said nozzles comprises means for supplying pressurized fuel to said metering valve when it is in its minimum flow position, and further includes, means for preventing energization of said igniting means when said metering valve is in other than its minimum flow position.

5. In a gas turbine engine, means for controlling the flow of afterburner fuel and ignition thereof as in claim 2, wherein, the means for metering fuel flow comprise a metering valve having a minimum position in which a low rate of flow is provided to the nozzles, the means for initially supplying a low rate of fuel to said nozzles comprise means for supplying pressurized fuel to said metering valve when it is in its minimum flow position, and the means for reducing fuel flow comprises means for displacing the metering valve to its minimum flow position, and further includes, means, responsive to detection of ignition of said fuel, for de-energizing said ignition means, and means responsive to displacement of said metering valve to its minimum flow position for automatically re-energizing the igniting means.

6. In a gas turbine engine, means for controlling flow of afterburner fuel and ignition thereof as in claim 4 further comprising, means responsive to detection of ignition of said fuel for de-energizing said ignition means, means for preventing re-ignition of the ignition means prior to displacement of said throttle lever to a position removing said demand signal for afterburner operation, and means for selectively overriding said last named means and automatically re-energizing said igniting means responsive to displacement of said metering valve to its minimum flow position.

7. In a gas turbine engine, means for controlling flow of afterburner fuel and ignition thereof as in claim 2 wherein the metering means comprise a metering valve having a minimum position in which a very low rate of flow is provided to said nozzles, a signal-responsive actuator controlling said metering valve, means generating a signal for maintaining said metering valve in its minimum position, switch means biased to apply said minimum position signal to said actuator, a shut-off valve preventing flow of fuel to said nozzles, means responsive to movement of said throttle lever to a position demanding afterburner thrust, for opening said shut-off valve, thereby initially providing a very low flow rate to said nozzles, said ignition detecting means provide an output signal whenever there is ignition of afterburner fuel, AND logic circuit means having an output only when there are both ignition signal and thrust demand signal inputs thereto, said AND circuit being connected to the sources of said signals, means responsive to said AND circuit output for actuating said switch and removing the minimum position signal from said torque motor and applying the demand signal thereto, whereby afterburner fuel flow is then controlled as a function of the demand signal and the metering valve returns to its minimum flow position when the ignition signal input is removed from the AND logic circuit means in the event of an afterburner flame-out.

8. In a gas turbine engine, means for controlling flow of afterburner fuel and ignition thereof as in claim 7 further comprising, a second AND logic circuit means requiring two signal inputs thereto to obtain an output, the first of said inputs being provided by the thrust demand signal, the second of said inputs being provided by a NOT logic circuit means having an output whenever there is no input signal thereto, and an AND latch logic circuit means having inputs from said thrust demand signal and said ignition signal, said AND latch circuit providing an output and consequent input to the NOT circuit when both thrust demand signal and ignition signal inputs are provided thereto and continuing to provide an output until both signal inputs are removed, whereby in the event of a flame-out, the igniting means cannot be re-energized until the throttle lever is displaced to remove the thrust demand signal from the AND latch circuit and then returned to a position demanding afterburner thrust.

9. In a gas turbine engine, means for controlling flow of afterburner fuel and ignition thereof as in claim 7 further comprising, means, including a transducer, for providing a signal indicating that the metering valve is in its minimum flow position, second AND logic circuit means providing an output signal when both minimum flow valve position signal and thrust demand signal inputs are provided thereto, said second AND circuit being connected to the sources of said signal inputs, means responsive to an output from said second AND circuit for energizing said igniting means, whereby once fuel flow is controlled as a function of demand signal, the igniting means is de-energized as the metering valve moves past its minimum flow position and, in the event of a flame-out, will be automatically re-energized when the metering valve is returned to its minimum flow position as a result of a loss of output from the first AND circuit.

10. In a gas turbine engine, means for controlling flow of afterburner fuel and ignition thereof as in claim 7 further comprising, means including a transducer for providing a signal indicating that the metering valve is in its minimum flow position, second AND logic circuit means providing an output signal in response to three input signals thereto, said three inputs comprising, (a) a connection with the thrust demand signal,
(b) a connection with the minimum flow valve position signal source, and
(c) the output of a NOT logic circuit means, which has an output when there is no input signal thereto, AND latch logic circuit means having an output providing an input to said NOT circuit means, said AND latch circuit being connected to and having an output when there are inputs from both the thrust demand signal and ignition signal, and continuing to provide an output until both signal inputs thereto are removed, whereby the igniting means can be energized only when the metering valve is in its minimum flow position and, in the event of a flame-out, the igniting means cannot be re-energized until the throttle lever is displaced to removed the thrust demand signal and re-energized upon further displacement of the throttle lever to demand afterburner thrust.

11. In a gas turbine engine, means for controlling flow of afterburner fuel and ignition thereof as in claim 10, further comprising, a pilot-operated switch for selectively removing the thrust demand signal from the AND latch logic circuit means, whereby the igniting means can be re-energized without requiring throttle lever displacement or, if the switch is opened prior to a flame-out, re-energization of the igniting means will occur automatically upon return of the metering valve to its minimum flow position.

References Cited

UNITED STATES PATENTS 2,984,970  5/1961  Bertaux et al. _____ 60—243

JULIUS E. WEST, *Primary Examiner.*